United States Patent Office 2,722,475
Patented Nov. 1, 1955

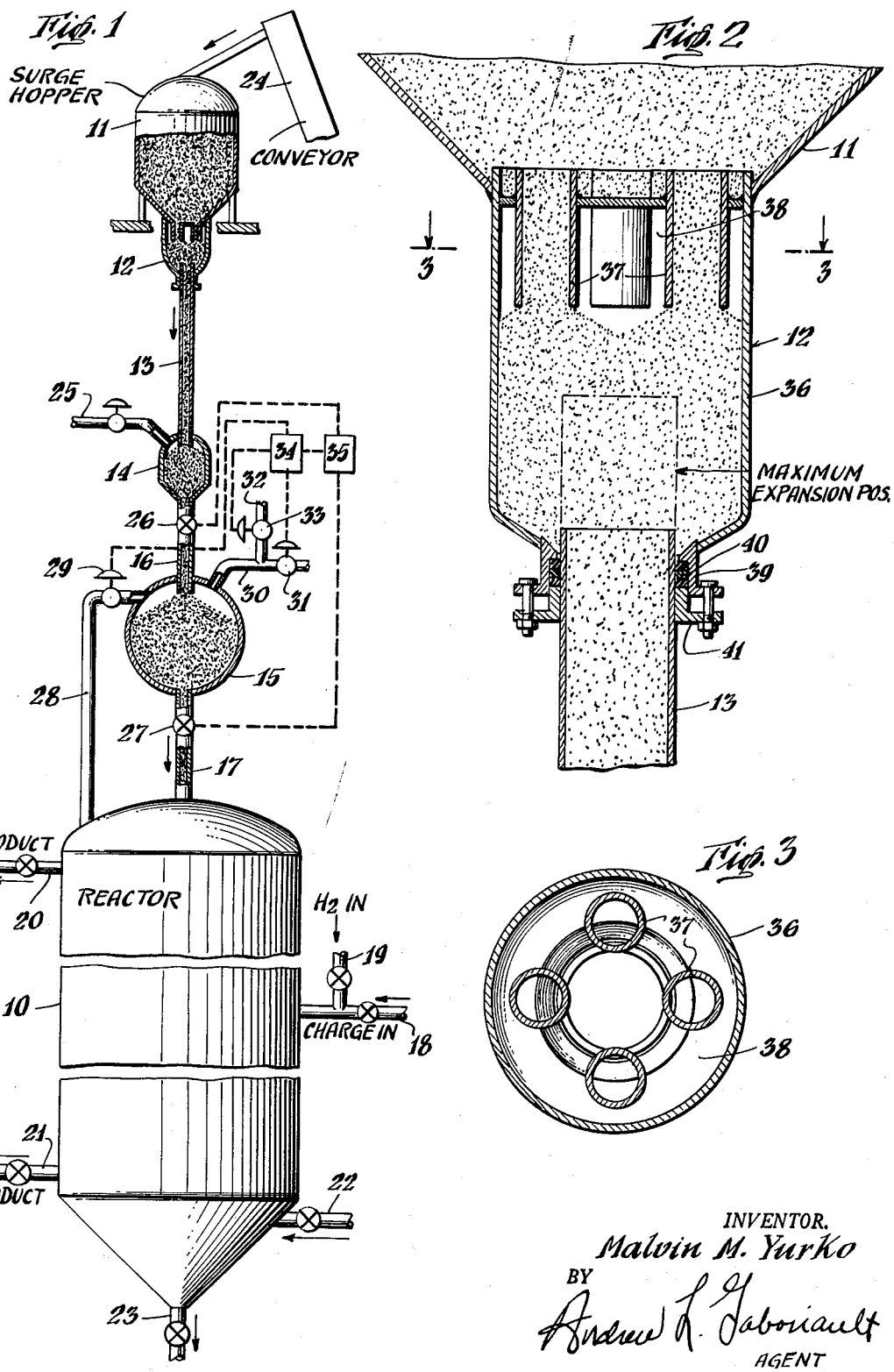

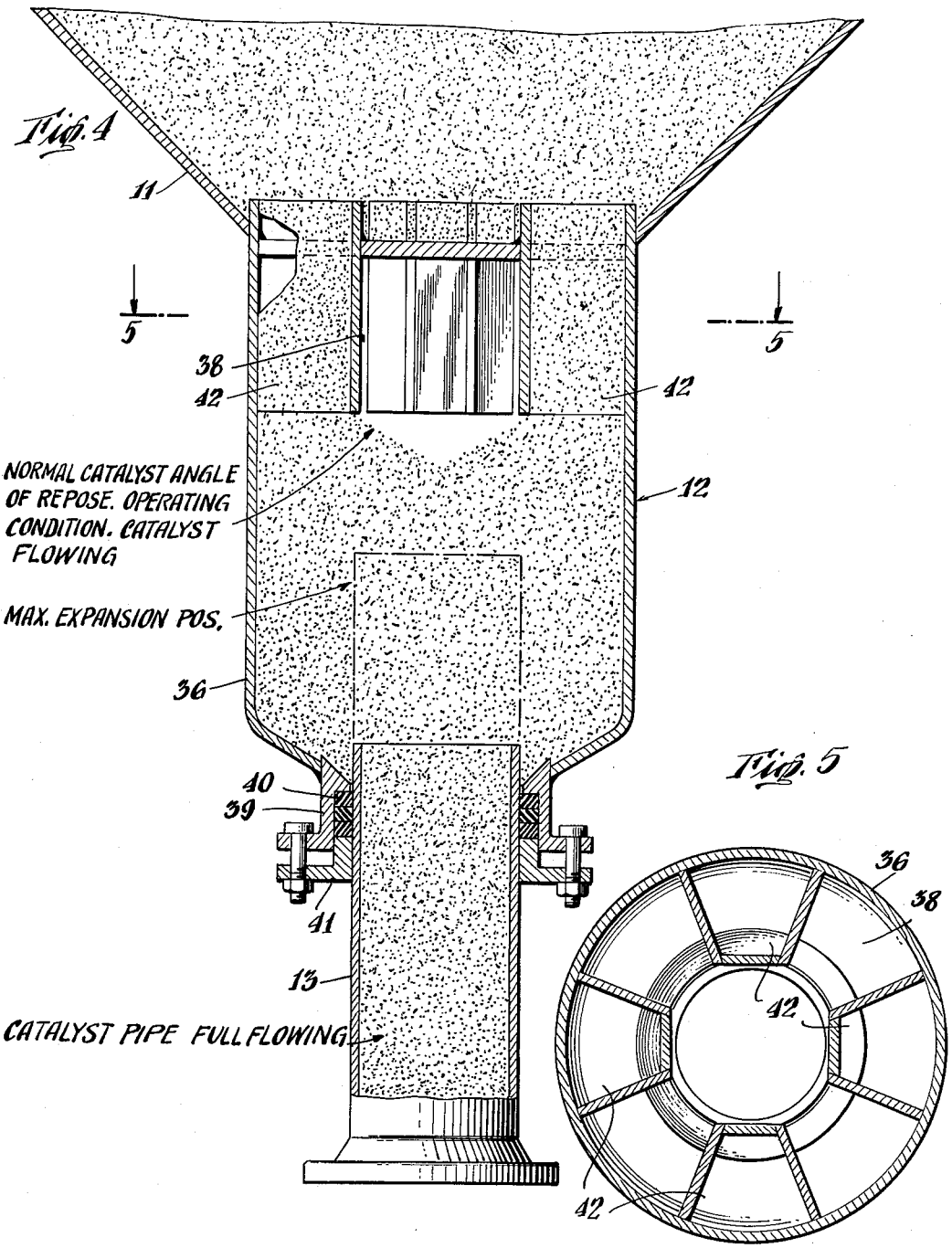

2,722,475

APPARATUS FOR THE RELIEF OF EXPANSION IN SYSTEMS UTILIZING COMPACT MASSES OF GRANULAR SOLIDS

Malvin M. Yurko, Elmont, N. Y., assignor to Socony Mobil Oil Company, Inc., a corporation of New York Application July 30, 1952, Serial No. 301,658

5 Claims. (Cl. 23—288)

This invention concerns an apparatus for the transfer of granular solids from the upper to the lower of two superimposed vessels and is particularly concerned with an apparatus for use in such systems to relieve any increase in length of the pipes and vessels in the system due to expansion. Typical of systems to which this invention may be applied is the continuous catalytic reforming or cracking of hydrocarbons wherein a granular solid catalytic material is cycled between a reaction and regeneration vessel as a substantially compact stream.

In systems of the above type and many others employing granular solids, the solids are circulated through the cyclic system at temperatures of the order of 850° F. to 1150° F. and upwards. The use of these high temperatures results in considerable thermal expansion of the reaction and regeneration vessels and piping connected thereto which must be relieved in some manner to avoid buckling of the conduits in the upper sections of the apparatus. Conventional expansion devices, such as slip joints, are adequate to relieve the expansion where the pipe is empty or where the granular solids are constantly flowing through the pipe. Frequently, however, a substantial amount of expansion will occur in metal parts below a point where a valve is closed in a conduit containing a compact mass of granular solids. This expansion will not only seek to force the metal pipe above the valve upwardly, but also will seek to force granular solids upwardly. Conventional devices do not relieve the force on the granular solids mass, so that when sufficient expansion has occurred, conduits or other parts will burst. Even if there is a vessel, as is usual, connected to the upper end of this pipe with some void space at its upper end, granular solids will not be forced into the vessel if there is any substantial height of granular solids already therein, but bursting or buckling of the pipe will rather occur since a major part of the force, due to expansion below the valve, is not transmitted upwardly through the granular solids as might be expected but is rather exerted outwardly against the walls of the pipe above the valve.

A major object of this invention is to provide an apparatus for the transfer of hot granular solids as a compact stream from the upper to the lower of two superimposed vessels which overcomes the above-described difficulties.

Another object of this invention is to provide an apparatus for use in conduits and pipes which are filled with a compact column of granular solids, which apparatus will relieve any increase in length of the conduits and pipes and vessels connected thereto due to expansion.

This invention provides an apparatus for transferring hot granular solids from an upper to a lower chamber. A receptacle is positioned between the two vessels and at least one passageway extends downwardly from the lower section of the upper chamber into the upper section of the receptacle to a level therein substantially below its upper end so that a solids-excluded plenum space is formed around said passageway in the upper section of said receptacle. A passageway extends upwardly from the lower chamber and slidably or movably into the lower end of the receptacle to a level below the lower end of the passageway extending from the upper chamber. Thus, if expansion occurs by reason of which a compact column of granular solids is forced upwardly, the expansion will be relieved by the movable passageway sliding upwardly a greater distance into the receptacle, possibly together with a plug of granular solids. This will force granular solids into the plenum space within the receptacle and thus avoid buckling of the passageways.

This invention will be best understood by referring to the attached drawings, of which Figure 1 is an elevational view, partially in section, of the application of this invention to a hydrocarbon reforming process.

Figure 2 is an elevational view, partially in section, of the apparatus of this invention for allowing for expansion.

Figure 3 is a sectional view along line 3—3 of Figure 2.

Figure 4 is an elevational view, partially in section, of an alternate form of the apparatus of this invention.

Figure 5 is a sectional view along line 5—5 of Figure 4.

All of these drawings are diagrammatic in form and like parts in all bear like numerals.

Turning to Figure 1, there is illustrated therein an apparatus for the reforming of hydrocarbons in the presence of grandular catalytic solids. Shown therein is a reaction vessel or chamber 10 with a surge chamber 11 positioned thereabove. Expansion joint 12 is fixed to the lower end of chamber 11 and a seal leg or conduit 13 extends slidably into the lower end of expansion joint 12. The lower end of seal leg 13 extends into seal chamber 14. A spherical pressuring chamber 15 is below chamber 14 and connected thereto by conduit 16. Conduit 17 connects the lower end of chamber 15 with the upper end of reactor 10.

In operation, the granular catalytic solids are passed through the reactor 10 as a downwardly gravitating, substantially compact bed. The pressure in the reaction zone is frequently quite high, for example, about 200 pounds per square inch gauge. Hydrocarbon charge, such as naphtha, is supplied centrally to the bed in reactor 10 through conduit 18. Hydrogen may be admitted with the charge through passage 19. The hydrocarbon charge is passed both upwardly and downwardly through the bed in reactor 10 and products withdrawn from the upper and lower sections of the reactor through passages 20 and 21. Spent granular solids are purged with an inert gas, such as steam or flue gas, admitted through passage 22 and then removed from the reactor through passage 23. The used solids are then usually passed to a catalyst regenerator where the solids are regenerated for re-use in the reaction zone by burning off carbonaceous contaminants deposited thereon. The regenerated granular solids are then passed by means of a conveyor 24 into surge hopper 11 for re-use in the reactor. The regeneration is normally best conducted at atmospheric pressure so that surge hopper 11 will also usually be at atmospheric pressure. Thus, it is necessary to provide a system which will transfer granular solids at atmospheric pressure substantially continuously to a reactor at a high pressure. In the system shown for this in Figure 1, the solids gravitate downwardly through seal leg 13 as a substantially compact stream or column into seal chamber 14. Inert seal gas, such as flue gas, is supplied to chamber 14 through passage 25 to maintain the pressure therein slightly above atmospheric, for example 1¼ pounds per square inch gauge. The granular solids are then supplied to pressuring chamber 15 to be pressured and then to a surge space in the top of reactor 10 on a cyclic basis. Valves 26 and 27, suitable for use in lines flowing full of granular solids, are provided above and below chamber 15 respectively. A gas line 28 with valve 29 connects the top of reactor 10 with the upper section of chamber 15 at a level above that at which granular solids accumulate therein. A pressuring line 30 with valve 31 connects into the upper section of chamber 15 and a depressuring line 32 with valve 33 extends from line 30 between valve 31 and vessel 15. A pressuring cycle may be considered to begin with chamber 15 empty of granular solids and at atmospheric pressure and valves 26, 27, 29, 31 and 33 all closed. All of these valves are operated in the cycle by controllers 34 and 35. First, valve 26 is opened and chamber 15 filled with granular solids. The granular solids fill chamber 15 up to the level of the normal angle of repose of the granular solids, generally about 30 degrees with the horizontal, so that a gas space is defined in the upper section of chamber 15. Next, valve 26 is closed and 31 is opened to admit a pressuring gas, such as flue gas or vaporized hydrocarbons, to vessel 15 under a pressure near the pressure in reactor 10. After the pressuring, valve 31 is closed and valve 29 opened to equalize the pressure in the reactor and chamber 15. Valve 27 is then opened and the granular solids passed from chamber 15 into a surge space in the upper end of reactor 10 which supplies the reaction bed of granular solids in the reactor. After chamber 15 is empty, valves 27 and 29 are closed and valve 33 opened to reduce the pressure to atmospheric. A new cycle then begins. The granular solids in this system may come from the regenerator at temperatures as high as 1200° F., so that when the system is started up from atmospheric temperatures, there will be considerable thermal expansion of the metal parts of the system. Thus, where reactor 10 is supported at the bottom, as is frequently the case, and surge hopper 11 is also supported at the bottom with vessels 14 and 15 merely supported by the connecting pipes, the entire expansion of the reactor 10, plus all the pipe and vessels to the bottom of the surge hopper 11, must be relieved in some manner to prevent buckling of the pipes above the reactor. This expansion may, for commercial size units, amount to as much as 12 inches. The expansion of the metal could be relieved by conventional expansion joints. However, another problem occurs because of the fact that the valve 26 or 27 is closed a major portion of the time so that a static column of granular solids lies above the closed valve. If expansion of parts below one of these valves occurs while the granular solids are not flowing, it not only exerts force on the metal above the closed valve, but also on the granular solids column thereabove, tending to force the column upwardly. The column, or any substantial part thereof, cannot be forced into the surge hopper because, while there may be space at the upper end of the hopper, the height of solids in the hopper is normally such as to prevent any such forcing. Thus, if the expansion becomes great enough the pipes will burst or buckle from the force exerted on the granular solids column even through conventional provision is made for the expansion of the pipe itself.

One form of the apparatus of this invention for providing for the expansion and contraction in systems using granular solids in compact form is shown in Figures 2 and 3. Illustrated therein is the expansion joint 12 of Figure 1. This consists of an upright closed receptacle 36 adapted to be fitted on top to the lower section of a vessel such as surge hopper 11. A plurality of conduits or ducts 37 for granular solids flow arranged in a circular pattern extend from chamber 11 vertically through the upper end of receptacle 36 to a common level therein substantially below the upper end of the receptacle. The total horizontal cross-sectional area of all of conduits 37 is substantially less than the horizontal cross-sectional area of receptacle 36, so that a solids-free plenum space 38 is defined in the upper section of receptacle 36 between conduits 37 and above the level to which granular solids fill the receptacle when they issue from ducts 37. Extending slidably into the lower end of receptacle 36 to a level below ducts 37 is conduit 13 which forms the upper section of the granular solids passageway to reactor 10. Around conduit 13 is a packing gland 39 with packing 40 held in position by packing nut 41. Receptacle 36 and conduits or ducts 37 are of such a length that the upper end of conduit 13 will be below the lower ends of ducts 37 when 13 is in its maximum expanded condition (shown by dashed lines in Figure 2) as well as its cold position. During expansion then, pipe 13 protrudes further and further into receptacle 36. If any of this expansion occurs below a closed valve, a plug of compact granular solids of volume equal to the increase in volume of the pipe within receptacle 36 caused by the expansion below the closed valve is forced into receptacle 36 and a like volume forced back into plenum space 38, thereby relieving the stress on the solids column in the pipe 13 and avoiding any buckling of pipe 13 or any other pipe in the system. The height of granular solids in receptacle 36 between plenum space 38 and the upper end of 13 is kept low, so that there is no difficulty in forcing granular solids back into space 38. This distance is very small compared to the overall height of the surge hopper.

Figures 4 and 5 illustrate a second form of the expansion joint apparatus of this invention. The only difference between Figures 2 and 4 is that rather than using circular pipes 37 to pass granular solids from the surge hopper, the apparatus of Figure 4 uses flat sided ducts 42 spaced around the periphery of receptacle 36.

Ducts 37 or 42 are preferably, but not necessarily, arranged so that the major portion of plenum space 38 lies directly above conduit 13, so that when solids flow through the system, plenum space 38 will be emptied before flow begins through ducts 37 or 42. It is preferred, therefore, that the vertical projection of the discharge conduit be located within the ring of ducts located uniformly about the top of the receptacle. In the preferred arrangement, the feed ducts are laterally displaced with respect to the discharge conduit so that the solid particles discharged from the feed ducts form a sloping bed above the upper end of the discharge conduit. This bed will slope at the normal angle of repose for the material being transferred, which, for the granular particles used in cracking and reforming processes, is about 30 degrees with the horizontal. Imaginary lines drawn downwardly and inwardly from the closest points of the lower ends of the ducts at an angle of about 30 degrees with the horizontal should meet above the upper end of the discharge conduit at all times to insure flow of solids through the system. The volume of plenum space 38 required will vary with the particular system to which the invention is applied. With a valve very close to the upper end of conduit 13, which valve remains closed all the while that parts below the valve are heated to the desired temperature, the volume of plenum space 38 should be greater than the difference between the volume of conduit 13 within receptacle 36 after expansion to the operating temperature and its volume in the receptacle before expansion. When a system like Figure 1 is used where granular solids are alternately stagnant and flowing in conduit 13, the volume of plenum space 38 need only be greater than the increase in volume of conduit 13 within receptacle 36 during one no-flow period and not greater than the total increase in volume of 13 within 36. However, to provide protection of the system under all conditions, space 38 should have a volume greater than the total increase in volume of conduit 13 within receptacle 36 during the entire expansion. For the average commercial size installation with a vessel like reactor 10 supported at the bottom, the volume of plenum space 38 should be greater than 1.25 feet of the upper end of conduit 13 to provide for protection of the system under all conditions of operation.

The height of receptacle 36 should be such that the upper end of conduit 13 will be below the lower ends of ducts 37 when the conduit is in both its maximum and minimum position in receptacle 36. However, the height of receptacle 36 should not be such that there is any difficulty in forcing granular solids into plenum space 38. Generally, in its maximum expanded position the upper end of conduit 13 should be about 5 to 10 inches below the lower ends of ducts 37 or 42, while in its minimum position the upper end of conduit 13 should be about 10 to 22 inches below the lower ends of ducts 37 or 42. Preferably, the distance between the upper end of the conduit and the lower end of the ducts, when the conduit is in the maximum position, should be about that determined by the equation $H=0.4d+0.2(D-d)$, while in the minimum position the distance should be that determined by the equation $H=0.4d+0.2(D-d)+E$, where $H=$distance between conduit 13 and ducts 37 or 42; $d=$diameter of conduit 13; $D=$diameter of receptacle 36; $E=$the increase in the length of conduit 13 within receptacle 36 during the expansion=height of conduit 13 above ground level at maximum expansion minus height of conduit 13 above ground level with no expansion.

This invention may be applied to many other systems utilizing granular solids besides that shown; for example, it will find use in systems for the catalytic or thermal cracking of high boiling hydrocarbons to lower boiling hydrocarbons in the presence of a moving mass of granular solids. This invention may be used with any solids of palpable particulate form as distinguished from finely divided powders, and the term "granular" as used herein should be understood to include any solids of this form. Generally, the solids should be within the range about 1 inch to 100 mesh by Tyler standard screen analysis.

The expansion joint 12 need not be attached to the lower end of supply hopper 11, but could be anywhere else in the system between the two points which are fixed on vessels 10 and 11.

In a suitable construction of apparatus 12, according to this invention, for a reforming system similar to Figure 1, receptacle 36 was 2 feet, 7¼ inches high from the opening through which conduit 13 passed to the closed top of the receptacle and had a 28 inch diameter. Four ducts like ducts 42 of Figure 4 were extended into receptacle 36 a distance of 10½ inches. The inner side of each duct was 7 inches from the center of receptacle 36 and the other sides of the ducts were spaced 45 degrees apart around the periphery of the receptacle, so that the volume of plenum space 38 was about 1.3 cubic feet. Conduit 13 had a 13 inch inside diameter and extended into receptacle 36 1¼ inches in its minimum position. In its maximum position conduit 13 extended into the receptacle about 13¼ inches. This apparatus was designed to handle an instantaneous flow rate of 175 tons per hour, when valves below it were opened, of a granular reforming catalyst of a size within the range about 5 to 7 mesh by Tyler standard screen analysis.

It should be understood that it is intended to cover herein all changes and modifications of the examples of the invention herein chosen for purposes of disclosure which do not constitute departures from the spirit and scope of the invention.

I claim:

1. An improved expansion joint for use in an elongated transfer system, adapted to carry a compact stream of hot granular solids from a fixed upper chamber to a fixed lower chamber, which prevents rupture of the walls of the system when flow of solids therethrough is interrupted, comprising in combination: a first means attached to the upper chamber, for gravitation of a column of solids therethrough, terminating at its lower end in a first passageway of restricted cross-section, a receptacle attached to the lower end of said first passageway, having an enlarged horizontal cross-section with respect to said passageway, a second means for gravitation of solids, attached to the lower chamber and extending upwardly therefrom, terminating at its upper end in a second passageway of restricted cross-section, the upper end of the passageway extending movably into said receptacle and terminating therein at a level below but not substantially below said first passageway, the first and second passageways being laterally displaced, so as to provide a particle-free region above the upper end of the second passageway and the receptacle being shaped to insure that the particle-free region above the second passageway is large enough to prevent rupture of the transfer system, when flow of solids through the system is interrupted.

2. An improved expansion joint for use in an elongated transfer system, adapted to carry a compact stream of hot granular solids from a fixed upper chamber to a fixed lower chamber, which prevents rupture of the walls of the system when flow of solids therethrough is interrupted, comprising in combination: a first means attached to the upper chamber, for gravitation of a column of solids therethrough, terminating at its lower end in a first passageway of restricted cross-section, a receptacle attached to the lower end of said first passageway, having an enlarged horizontal cross-section with respect to said first passageway, a second means for gravitation of solids, attached to the lower chamber and extending upwardly therefrom, terminating at its upper end in a second passageway of restricted cross-section, the upper end of the passageway extending movably into said receptacle and terminating therein at a level below but not substantially below said first passageway, valve means in said second means for gravitation of solids, for stopping the flow of solids therethrough, the ends of said first and second passageways being laterally displaced, so as to provide a particle-free region above the upper end of the second passageway and the receptacle being shaped to insure that the particle-free region above the second passageway is large enough to prevent rupture of the transfer system, when flow of solids through the system is stopped.

3. An improved expansion joint for use in an elongated transfer system, adapted to carry a compact stream of hot granular solids from a fixed upper chamber to a fixed lower chamber, which prevents rupture of the walls of the system when flow of solids therethrough is interrupted, comprising in combination: a first means attached to the upper chamber, for gravitation of a column of solids therethrough, terminating at its lower end in a first passageway of restricted cross-section, a receptacle attached to the lower end of said first passageway, having an enlarged horizontal cross-section with respect to said first passageway, a second means for gravitation of solids, attached to the lower chamber and extending upwardly therefrom, terminating at its upper end in a second passageway of restricted cross-section, the upper end of the passageway extending movably into said receptacle and terminating therein at a level below but not substantially below said first passageway, the distance between the fixed upper chamber and the fixed lower chamber being sufficient to provide a substantial vertical movement of the second passageway with respect to said receptacle under temperature changes encountered in the operation of said transfer system, valve means in said second means for gravitation of solids, for stopping the flow of solids therethrough, the ends of said first and second passageways being laterally displaced, so that an imaginary line drawn downwardly from the closest point of the upper passageway toward the second passageway at an angle of about 30 degrees with the horizontal passes over the upper end of the second passageway, the receptacle being of such shape that there is provided a region above the imaginary line in alignment with the second passageway which is large enough to prevent rupture of the transfer system, when flow of solids through the system is stopped.

4. An improved expansion joint for use in an elongated transfer system, adapted to carry a compact stream of hot granular solids from a fixed upper chamber to a fixed lower chamber, which prevents rupture of the walls of the system when flow of solids therethrough is interrupted, comprising in combination: a first means attached to the upper chamber, for gravitation of a column of solids therethrough, terminating at its lower end in a first passageway of restricted cross-section, a receptacle attached to the lower end of said first passageway, having an enlarged horizontal cross-section, substantially larger than that of the first passageway, the first passageway being projected downwardly into said receptacle a substantial distance, a second means for gravitation of solids, attached to the lower chamber and extending upwardly therefrom, terminating at its upper end in a second passageway of restricted cross-section, the upper end of the passageway extending movably into said receptacle and terminating therein at a level below said first passageway, valve means in said second means for gravitation of solids, for stopping the flow of solids therethrough, the ends of said first and second passageways being laterally displaced, so that an imaginary line drawn downwardly from the closest point of the upper passageway toward the second passageway at an angle of about 30 degrees with the horizontal passes over the upper end of the second passageway, the second passageway extending into said receptacle a distance such that when said passageway is in the position of minimum expansion the vertical distance between the ends of the first and second passageway is within the range about 10–22 inches, and when said passageway is in a position of maximum expansion the vertical distance between the ends of said passageways is within the range about 5–10 inches.

5. An improved expansion joint for use in an elongated transfer system, adapted to carry a compact stream of hot granular solids from a fixed upper chamber, which prevents rupture of the walls of the system when flow of solids therethrough is interrupted, comprising in combination: a receptacle of circular cross-section attached below said upper chamber, a plurality of feed ducts projected downwardly into said receptacle, at uniformly spaced points around the periphery of said receptacle and terminated within said receptacle at a common level, the cross-section of said ducts being substantially smaller than that of the receptacle, means for transfer of solids, connected between the receptacle and top of the lower chamber, terminating at its upper end in a discharge conduit, which extends movably into said receptacle, being in substantial alignment with the vertical axis of said receptacle, and being terminated therein at a level below said feed ducts, the diameter of the receptacle being large enough so that the vertical projection of the discharge conduit falls within the ring of feed ducts and the diameter of the receptacle being restricted so that imaginary lines drawn downwardly and inwardly from the closest points of the lower ends of the feed ducts at an angle of about 30 degrees with the horizontal meet at a point above the central discharge conduit, the vertical distance between the ends of the feed ducts and the discharge conduit, when the discharge conduit is in the maximum position, being equal to about that determined from the equation $H = 0.4d + 0.2(D-d)$, and when the discharge conduit is in the minimum position, that determined by the equation $H = 0.4d + 0.2(D-d) + E$, where $H =$ the vertical distance between the lower ends of the feed ducts and the upper end of the discharge conduit; $d =$ diameter of the discharge conduit; $D =$ diameter of the receptacle; $E =$ the increase in length of the discharge conduit from minimum to maximum position.

References Cited in the file of this patent

UNITED STATES PATENTS

| 2,298,119 | Gibert | Oct. 6, 1942 |
| 2,432,962 | Bergstrom | Dec. 16, 1947 |